(12) United States Patent
Nielsen et al.

(10) Patent No.: US 11,826,635 B2
(45) Date of Patent: *Nov. 28, 2023

(54) CONTEXT-SENSITIVE REMOTE EYEWEAR CONTROLLER

(71) Applicant: Snap Inc., Santa Monica, CA (US)

(72) Inventors: Simon Nielsen, Beverly Hills, CA (US); Jonathan Rodriguez, La Habra, CA (US); Yu Jiang Tham, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,486

(22) Filed: Dec. 7, 2022

(65) Prior Publication Data

US 2023/0126025 A1 Apr. 27, 2023

Related U.S. Application Data

(63) Continuation of application No. 17/034,700, filed on Sep. 28, 2020, now Pat. No. 11,541,305.

(51) Int. Cl.
*A63F 13/22* (2014.01)
*A63F 13/2145* (2014.01)
(Continued)

(52) U.S. Cl.
CPC ............ *A63F 13/22* (2014.09); *A63F 13/211* (2014.09); *A63F 13/2145* (2014.09);
(Continued)

(58) Field of Classification Search
None
See application file for complete search history.

(56) References Cited

U.S. PATENT DOCUMENTS 9,782,673 B2 * 10/2017 Takagi ................. A63F 13/2145
9,937,415 B1 * 4/2018 Makuch ................. A63F 13/22
(Continued)

FOREIGN PATENT DOCUMENTS

EP 2667583 A2 11/2013

OTHER PUBLICATIONS

International Search Report and Written Opinion for International Application No. PCT/US2021/051674, dated Jan. 4, 2022 (dated Apr. 1, 2022)—13 pages.

*Primary Examiner* — Peter J Iannuzzi
(74) *Attorney, Agent, or Firm* — Culhane Meadows PLLC; Stephen J. Weed

(57) ABSTRACT

Context-sensitive remote controls for use with electronic devices (e.g., eyewear device). The electronic device is configured to perform activities (e.g., email, painting, navigation, gaming). The context-sensitive remote control includes a display having a display area, a display driver coupled to the display, and a transceiver. The remote control additionally includes memory that stores controller layout configurations for display in the display area of the display by the display driver. A processor in the context-sensitive remote control is configured to establish, via the transceiver, communication with an electronic device, detect an activity currently being performed by the electronic device, select one of the controller layout configurations responsive to the detected activity, and present, via the display driver, the selected controller layout configuration in the display area of the display.

20 Claims, 16 Drawing Sheets

(51) Int. Cl.
    *A63F 13/24*     (2014.01)
    *A63F 13/327*     (2014.01)
    *A63F 13/92*     (2014.01)
    *A63F 13/40*     (2014.01)
    *G06F 3/0346*     (2013.01)
    *G06F 3/038*     (2013.01)
    *G06F 3/04842*     (2022.01)
    *G06F 3/04886*     (2022.01)
    *A63F 13/211*     (2014.01)

(52) U.S. Cl.
    CPC ............ *A63F 13/24* (2014.09); *A63F 13/327* (2014.09); *A63F 13/40* (2014.09); *A63F 13/92* (2014.09); *G06F 3/038* (2013.01); *G06F 3/0346* (2013.01); *G06F 3/04842* (2013.01); *G06F 3/04886* (2013.01); *G06F 2203/0384* (2013.01)

(56) References Cited

U.S. PATENT DOCUMENTS

| | | | |
|---|---|---|---|
| 11,541,305 B2* | 1/2023 | Nielsen | A63F 13/24 |
| 2010/0220064 A1* | 9/2010 | Griffin | G06F 3/0418 |
| | | | 345/173 |
| 2011/0285636 A1* | 11/2011 | Howard | G06F 3/04883 |
| | | | 345/173 |
| 2012/0154108 A1 | 6/2012 | Sugaya | |
| 2013/0162411 A1 | 6/2013 | Moses et al. | |
| 2013/0174079 A1* | 7/2013 | Morley | G06F 3/0236 |
| | | | 715/773 |
| 2013/0205206 A1* | 8/2013 | Hawver | G06F 3/0482 |
| | | | 715/704 |
| 2014/0132514 A1* | 5/2014 | Kuzara | G06F 1/1647 |
| | | | 345/169 |
| 2014/0184524 A1 | 7/2014 | Schiefer et al. | |
| 2014/0315636 A1* | 10/2014 | Zarfati | A63F 13/42 |
| | | | 463/31 |
| 2015/0077364 A1* | 3/2015 | Parthasarathy | G06F 3/005 |
| | | | 345/173 |
| 2015/0199899 A1 | 7/2015 | Tanaka et al. | |
| 2015/0378459 A1 | 12/2015 | Sawada | |
| 2017/0011624 A1 | 1/2017 | Guihot | |
| 2019/0227908 A1* | 7/2019 | Munafo | G06F 11/0736 |
| 2021/0252387 A1* | 8/2021 | Spofford | G06F 3/0482 |

* cited by examiner

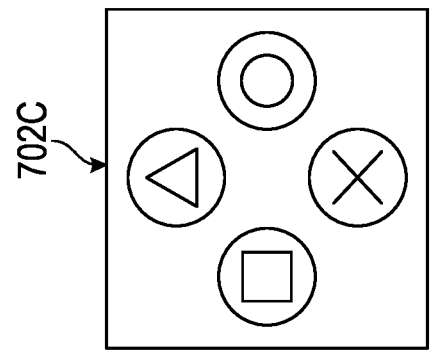
FIG. 7D
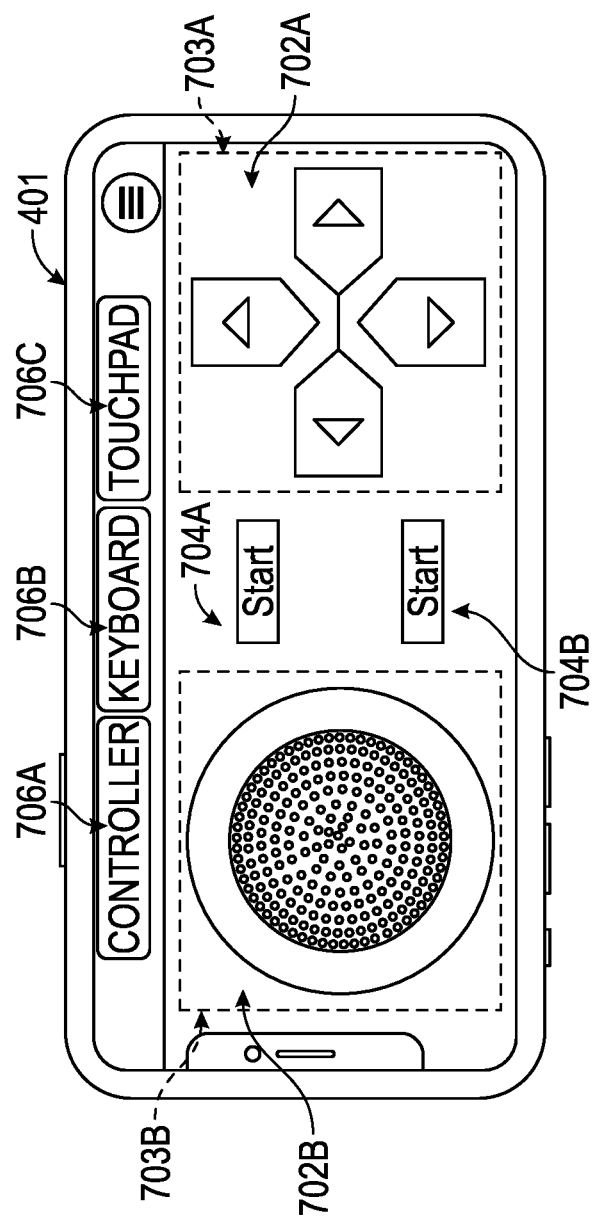
FIG. 7A
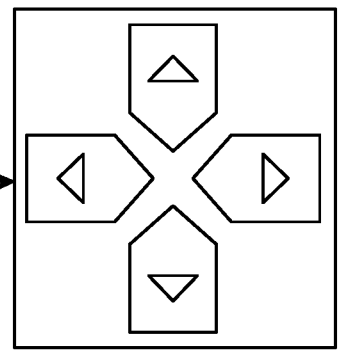
FIG. 7B
FIG. 7C

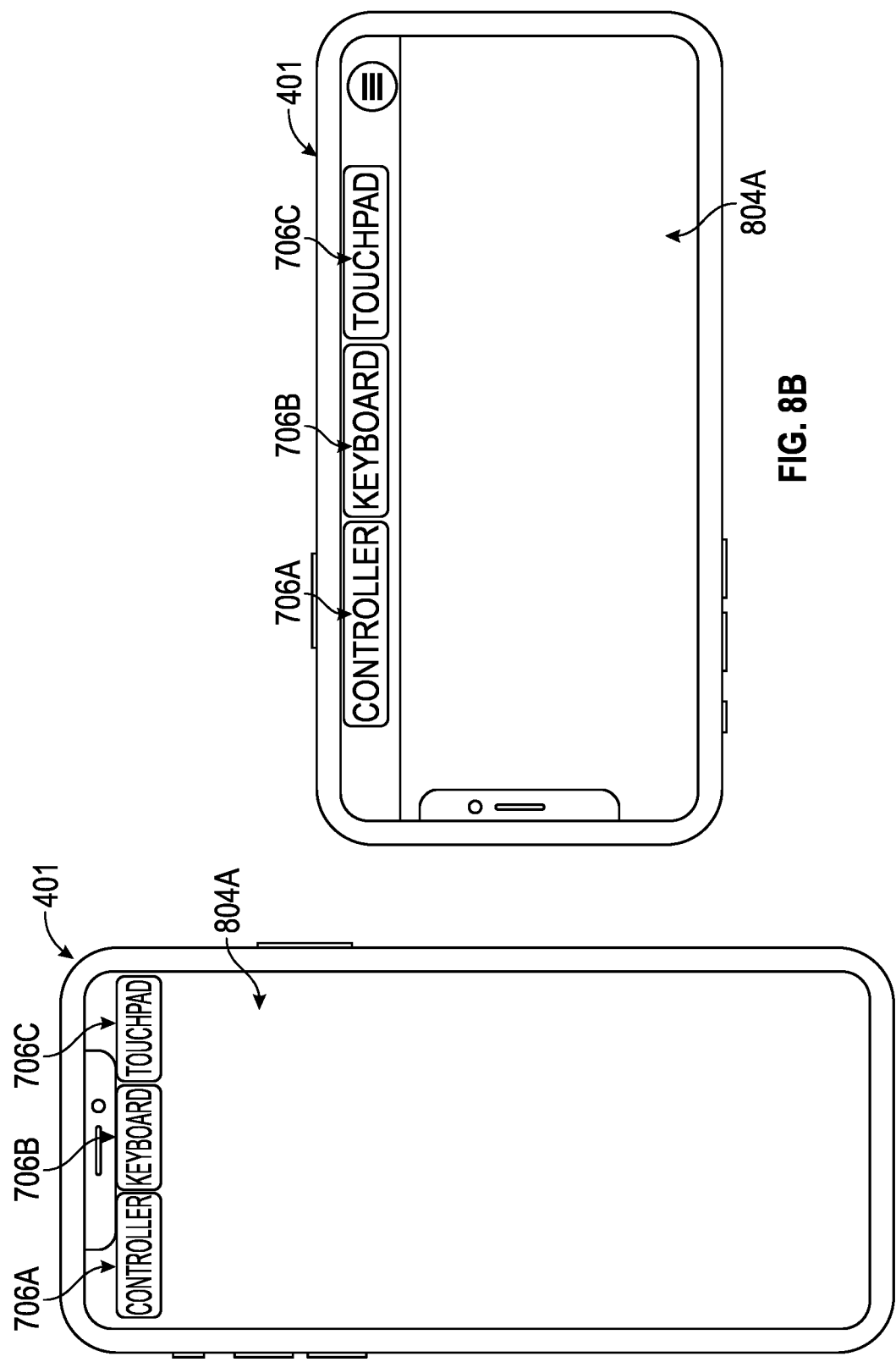

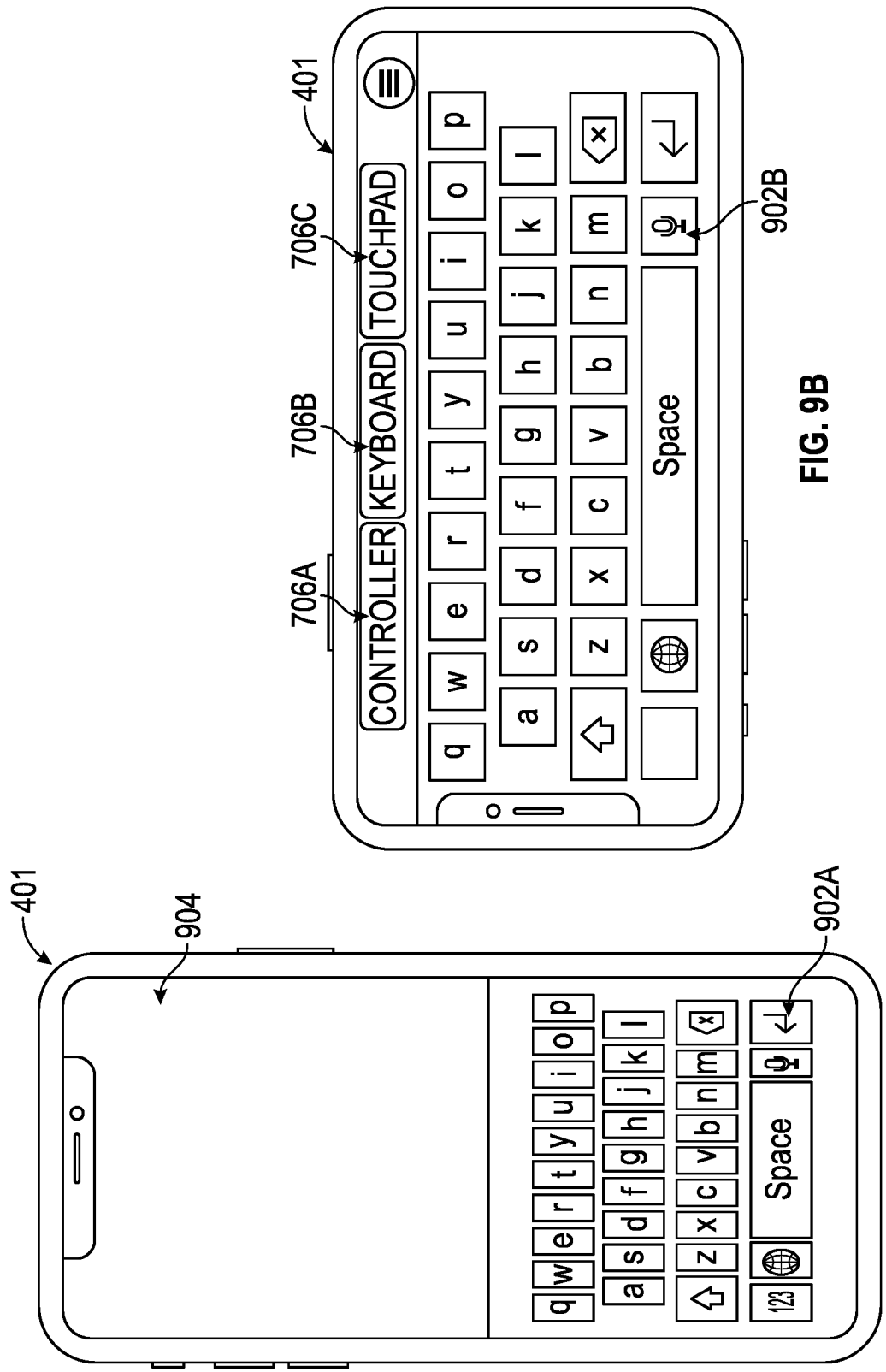

CONTEXT-SENSITIVE REMOTE EYEWEAR CONTROLLER

CROSS-REFERENCE TO RELATED APPLICATIONS

This application is a Continuation of U.S. application Ser. No. 17/034,700 filed on Sep. 28, 2020, the contents of which are incorporated fully herein by reference.

TECHNICAL FIELD

This disclosure relates to a remote control for eyewear. More specifically, this disclosure relates to a configurable remote control that adapts to activity taking place on the eyewear (i.e., a context-sensitive remote control).

BACKGROUND

Many types of mobile electronic devices available today, such as smartphones, tablets, laptops, handheld devices, and wearable devices (e.g., smart glasses, digital eyewear, headwear, headgear, and head-mounted displays), include a variety of cameras, sensors, wireless transceivers, input systems (e.g., touch-sensitive surfaces, pointers), peripheral devices, displays, and graphical user interfaces (GUIs) through which a user can interact with displayed content.

Remote controls enable users to interact with electronic devices. The remote controls may be connected to the electronic devices via a wired or a wireless connection.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element. When referring to such elements collectively or to one or more non-specific elements, the lower-case letter may be omitted.

The various elements shown in the figures are not drawn to scale unless otherwise indicated. The dimensions of the various elements may be enlarged or reduced in the interest of clarity. The several figures depict one or more implementations that are presented by way of example only and should not be construed as limiting. Included in the drawing are the following figures:

FIG. 7A is an illustration of a context-sensitive remote control with a controller layout configuration;

FIGS. 7B, 7C, and 7D are illustrations of controller layout components for use in configuring the context-sensitive remote control;

FIGS. 8A and 8B are illustrations of a context-sensitive remote control with a touchpad layout configuration in a vertical orientation and a horizontal orientation, respectively;

FIGS. 9A and 9B are illustrations of a context-sensitive remote control with a keyboard layout configuration in a vertical orientation and a horizontal orientation, respectively.

DETAILED DESCRIPTION

Figure 1A:
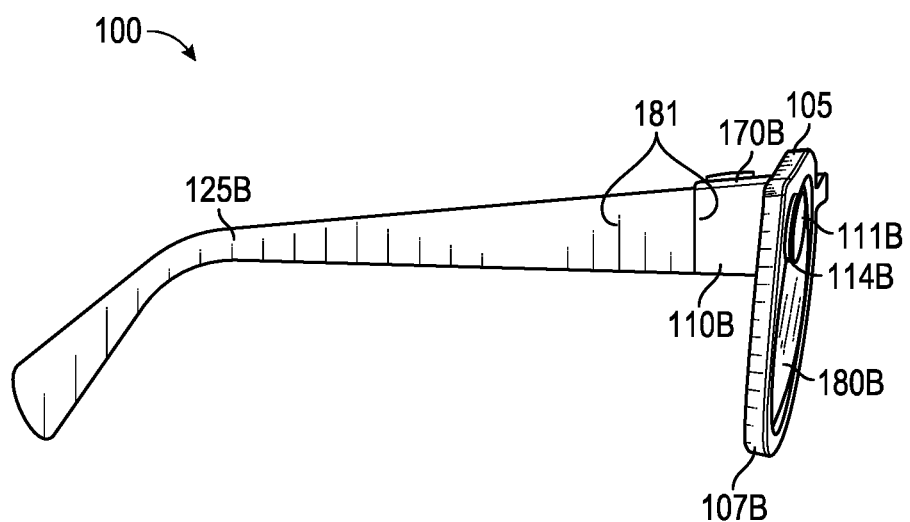
FIG. 1A is a side view (right) of an example hardware configuration of an eyewear device suitable for use in a context-sensitive remote control system.

Various implementations and details are described with reference to examples including a context-sensitive remote control system for an electronic device (such as an eyewear device). A context-sensitive remote control adapts to activity of the electronic device. For example, if the electronic device is in use to compose an email message, a keyboard is present on the context-sensitive remote control; if the electronic device is in use to play a game, a game controller is present on the context-sensitive remote control; if the electronic device is displaying a user interface (e.g., a GUI), a navigation screen corresponding to the user interface is present on the context-sensitive remote control; and if the electronic device is in use to paint a picture, a touch pad is present on the context-sensitive remote control.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices (such as context-sensitive remote controls), associated components and any other devices incorporating, for example, a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may additionally or alternatively include a touchpad on the left side.

The surface of the touchpad 181 is configured to detect finger touches, taps, and gestures (e.g., moving touches) for use with a graphical user interface (GUI) displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
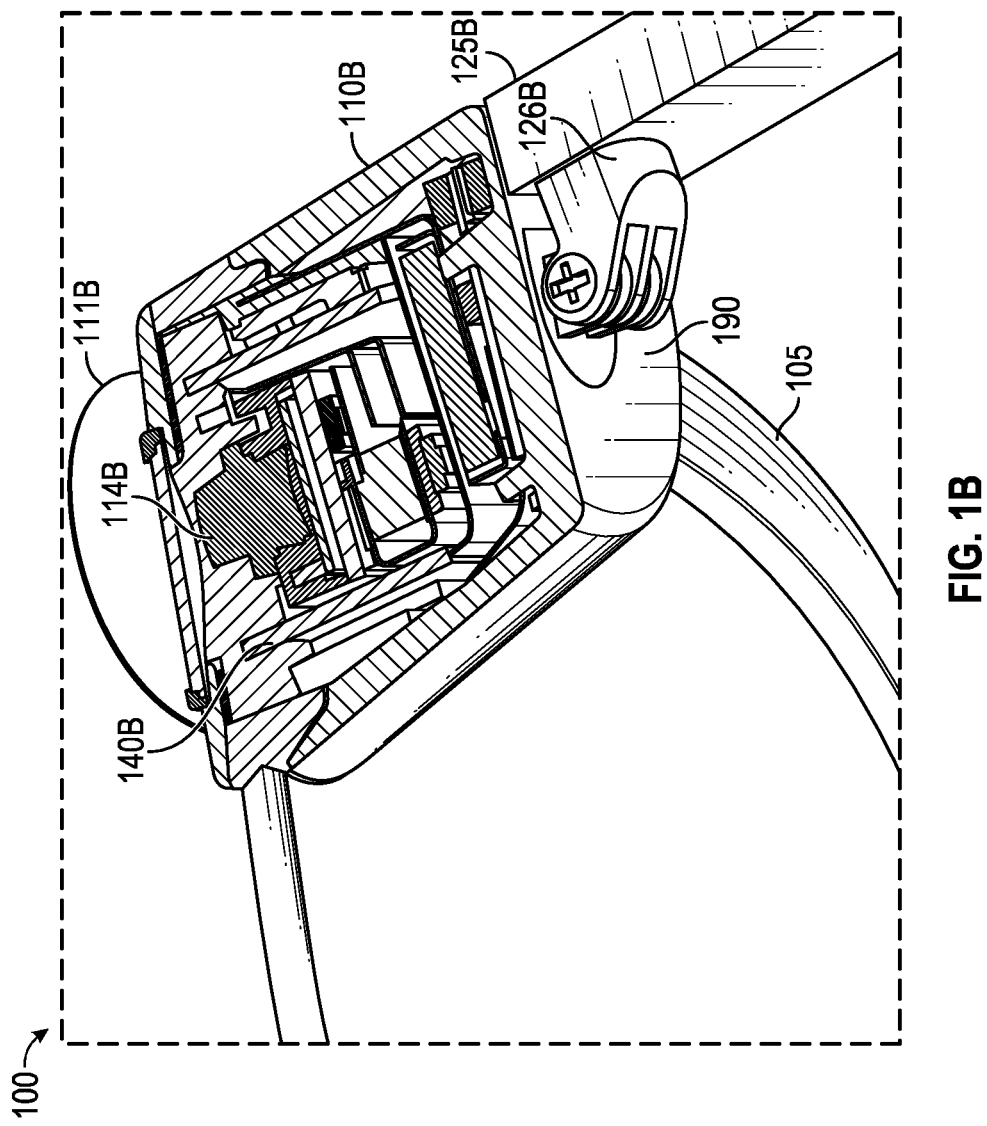
FIG. 1B is a perspective, partly sectional view of a right corner of the eyewear device of FIG. 1A depicting a right visible-light camera, and a circuit board.
Figure 1C:
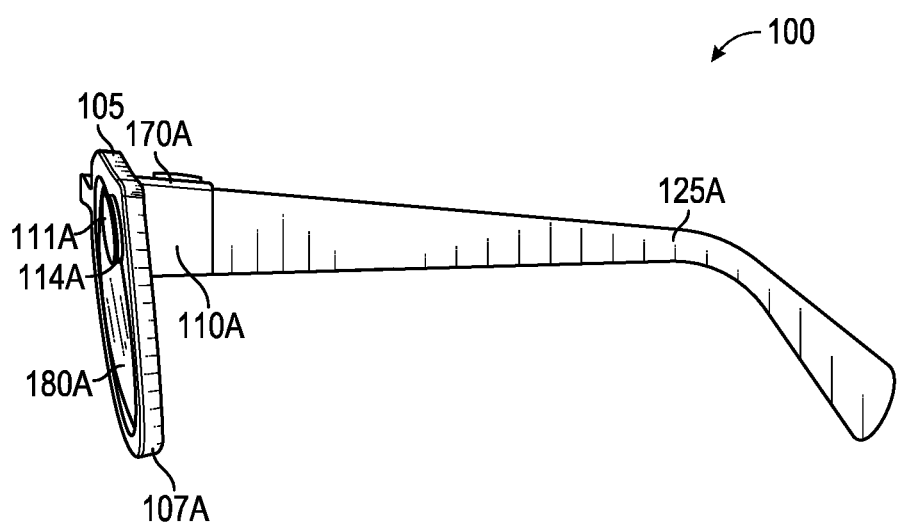
FIG. 1C is a side view (left) of an example hardware configuration of the eyewear device of FIG. 1A, which shows a left visible-light camera.
Figure 1D:
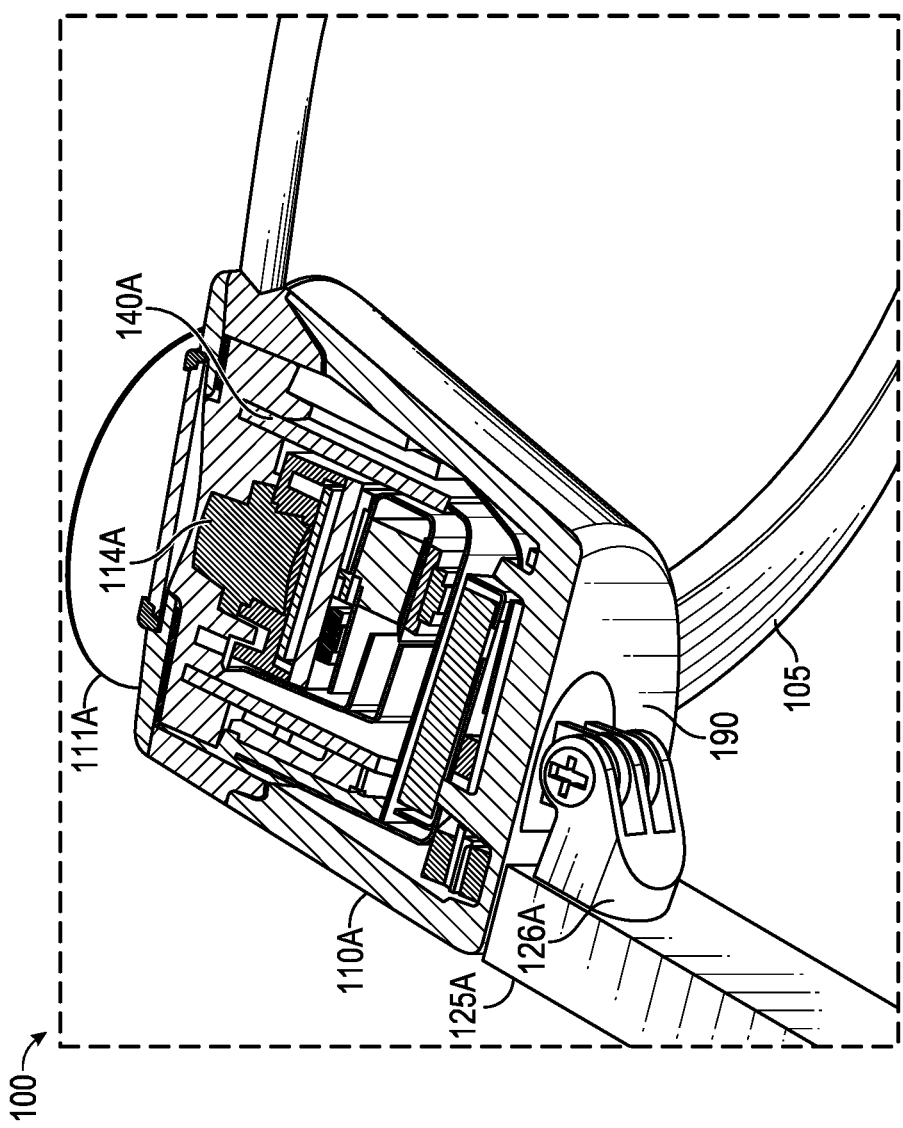
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
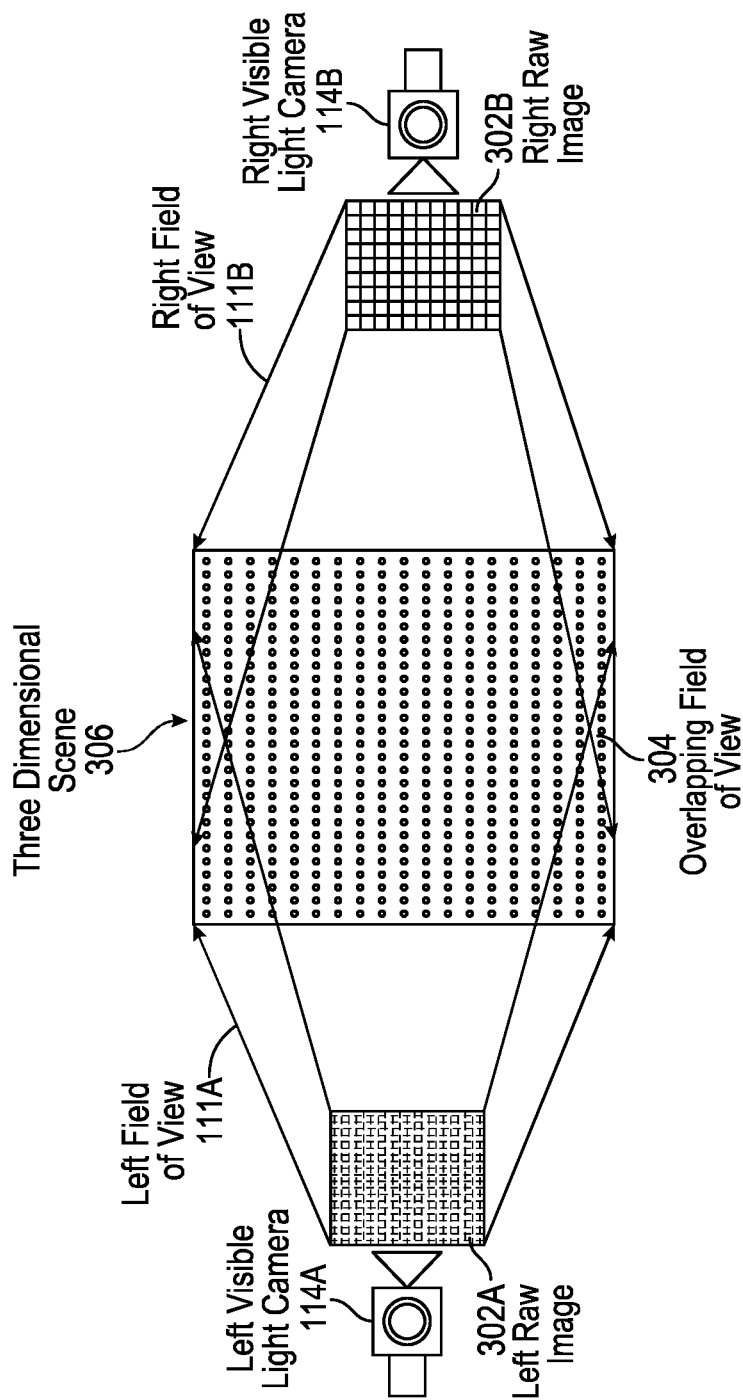
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example, visible-light cameras 114A, 114B have a field of view with an angle of view between 15° to 110°, for example 24°, and have a resolution of 480×480 pixels (or greater). The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, 1080p (or greater). Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
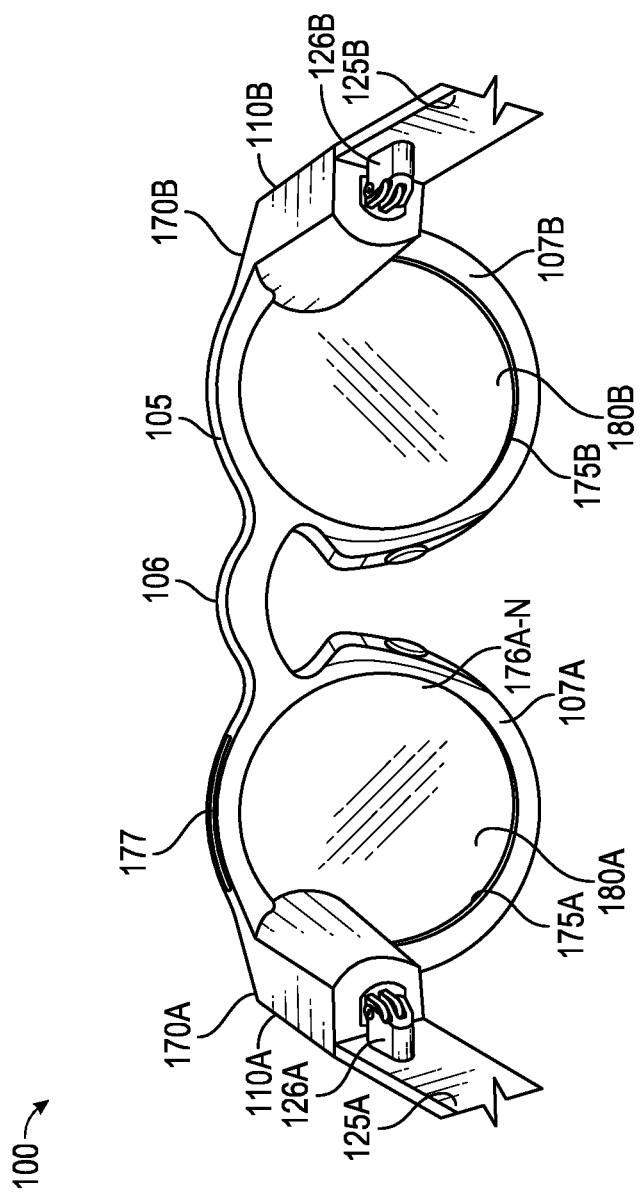
FIGS. 2A and 2B are rear views of example hardware configurations of eyewear devices with displays.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
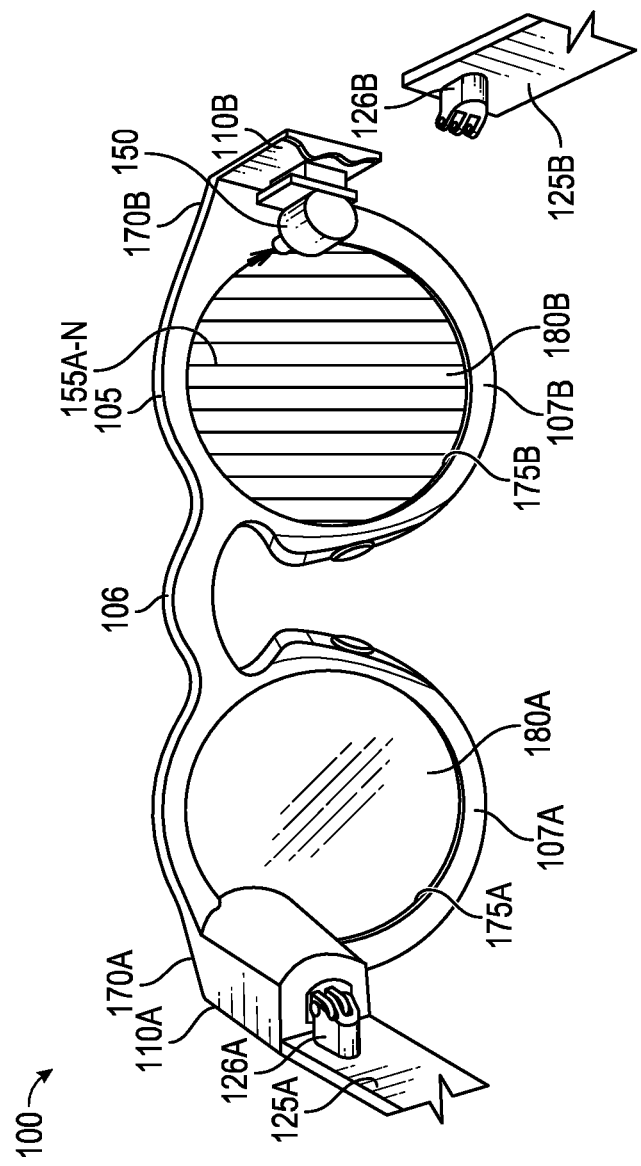

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double prime, A through N, not shown) which are configured to interact with light from the right projector 150B. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a time-stamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the context-sensitive remote control system 400 (FIG. 4) includes the eyewear device 100, which includes a frame 105 and a left corner 110A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left corner 110A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
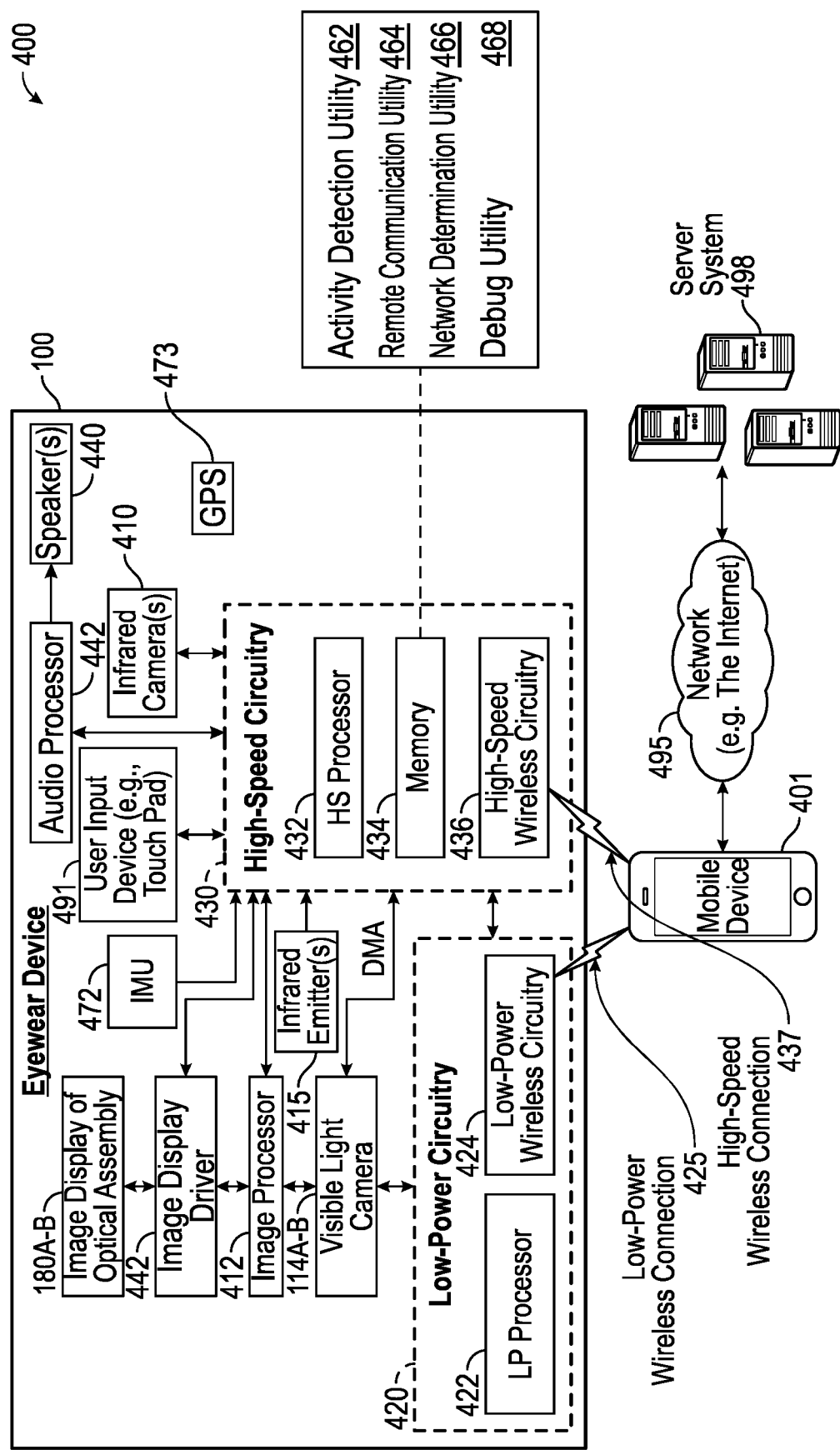
FIG. 4 is a functional block diagram of an example context-sensitive remote control system including a wearable device (e.g., an eyewear device), a mobile device (e.g., acting as a context-sensitive remote control) and a server system connected via various networks.

FIG. 4 is a functional block diagram of an example context-sensitive remote control system 400 that includes a wearable device (e.g., an eyewear device 100), a mobile device 401, and a server system 498 connected via various networks 495 such as the Internet. The context-sensitive remote control system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers 440 (e.g., one associated with the left side of the eyewear device and another associated with the right side of the eyewear device). The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
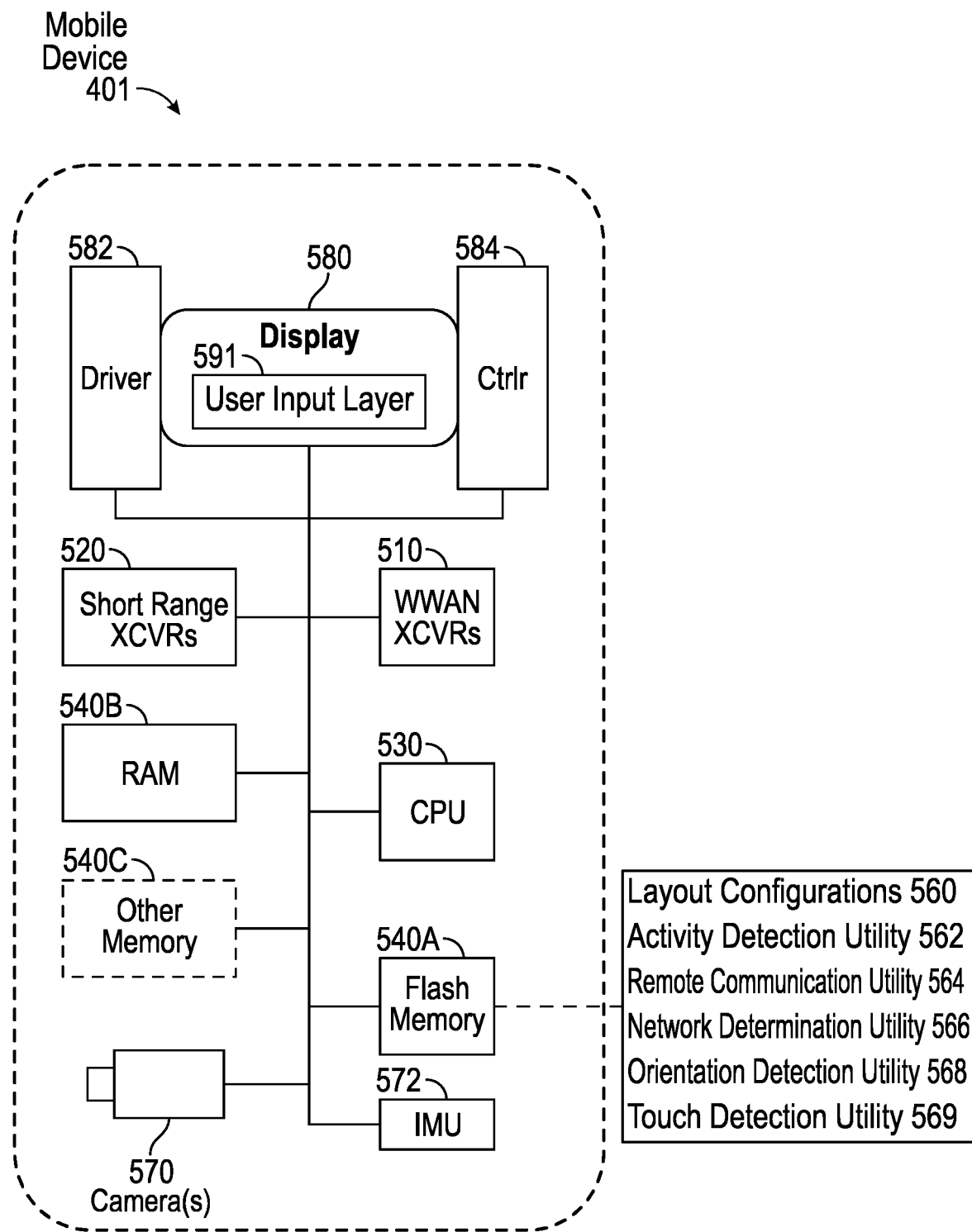
FIG. 5 is a diagrammatic representation of an example hardware configuration for a mobile device of the context-sensitive remote control system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, an image display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The context-sensitive remote control system 400, as shown in FIG. 4, includes a computing device, such as mobile device 401, coupled to an eyewear device 100 over a network. The context-sensitive remote control system 400 includes a memory for storing instructions and a processor for executing the instructions. Execution of the instructions of the context-sensitive remote control system 400 by the processor 432 configures the eyewear device 100 to cooperate with the mobile device 401. The context-sensitive remote control system 400 may utilize the memory 434 of the eyewear device 100 or the memory elements 540A, 540B, 540C of the mobile device 401 (FIG. 5). Also, the context-sensitive remote control system 400 may utilize the processor elements 432, 422 of the eyewear device 100 or the central processing unit (CPU) 530 of the mobile device 401 (FIG. 5). In addition, the context-sensitive remote control system 400 may further utilize the memory and processor elements of the server system 498. In this aspect, the memory and processing functions of the context-sensitive remote control system 400 can be shared or distributed across the eyewear device 100, the mobile device 401, and the server system 498.

The memory 434 includes, for execution by the processor 432, an activity detection utility 462, a remote communication utility 464, a network determination utility 466, and a debug utility 468. The activity detection utility 462 monitors the high speed circuitry 430 and the low-power circuitry 420 to determine the activity (e.g., email, painting, user-interface navigation, gaming, etc.) currently being performed by the eyewear device 100 that a user is interacting with. In one example, the activity detection utility 462 identifies an activity presenting controls or a graphical user interface (GUI) in the foreground of an image display 180. The remote communication utility 464 identifies and establishes communication with a context-sensitive remote control (e.g., mobile device 401). The network determination utility 466 monitors available communication methods (e.g., Bluetooth LE and WiFi) and the bandwidth requirements for data flow between the electronic device and the context-sensitive remote control, and selects the communication method that utilizes the communication method able to provide suitable communication with the lowest level of energy consumption. The debug utility 468 detects when the electronic device is in a debug mode and sends debugging information to the context-sensitive remote controller for display.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, an image display driver 582 to control the image display 580, and a display controller 584. In the example of FIG. 5, the image display 580 includes a user input layer 591 (e.g., a touchscreen) that is layered on top of or otherwise integrated into the screen used by the image display 580. The image display driver 582 is coupled to CPU 530 in order to drive the display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 891 for receiving input (by touch, multi-touch, or gesture, and the like, by hand, stylus or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 5. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. Example operations include various general operations of the mobile device, as well as operations related to the programming for applications on the mobile device.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

In the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The memory 540A includes layout configurations 560 (see, for example, layout configurations depicted in FIGS. 7A, 8A, and 9A) for display on the context-sensitive remote control to control activity on the electronic device (e.g., eyewear device 100). In one example, identifiers for the layout configurations and corresponding layout configuration memory locations are stored in a table in flash memory 540A.

Additionally, the memory 540A includes, for execution by the processor 530, an activity detection utility 562, a remote communication utility 564, a network determination utility 566, an orientation detection utility 568, and a touch detection utility 569.

The activity detection utility 562 monitors communications from the electronic device and detects the activity currently being performed on the electronic device from the monitored communications. The remote communication utility 564, e.g., in conjunction with the remote communication utility 464, identifies and establishes communication with the electronic device. The network determination utility 566, e.g., in conjunction with the network determination utility 466, monitors available communication methods (e.g., Bluetooth LE and WiFi) and the necessary bandwidth for data flow between the mobile device and the context-sensitive remote control, and selects the communication method that utilizes the communication method able to provide suitable communication with the lowest level of energy consumption. The orientation detection utility 568 detects whether the context-sensitive remote control is in a horizontal orientation or a vertical orientation (e.g., based on input from IMU 572). The touch detection utility monitors finger presses (e.g., location and duration) on the display 580 (e.g., based on signals from user input layer 591).

Figure 6:
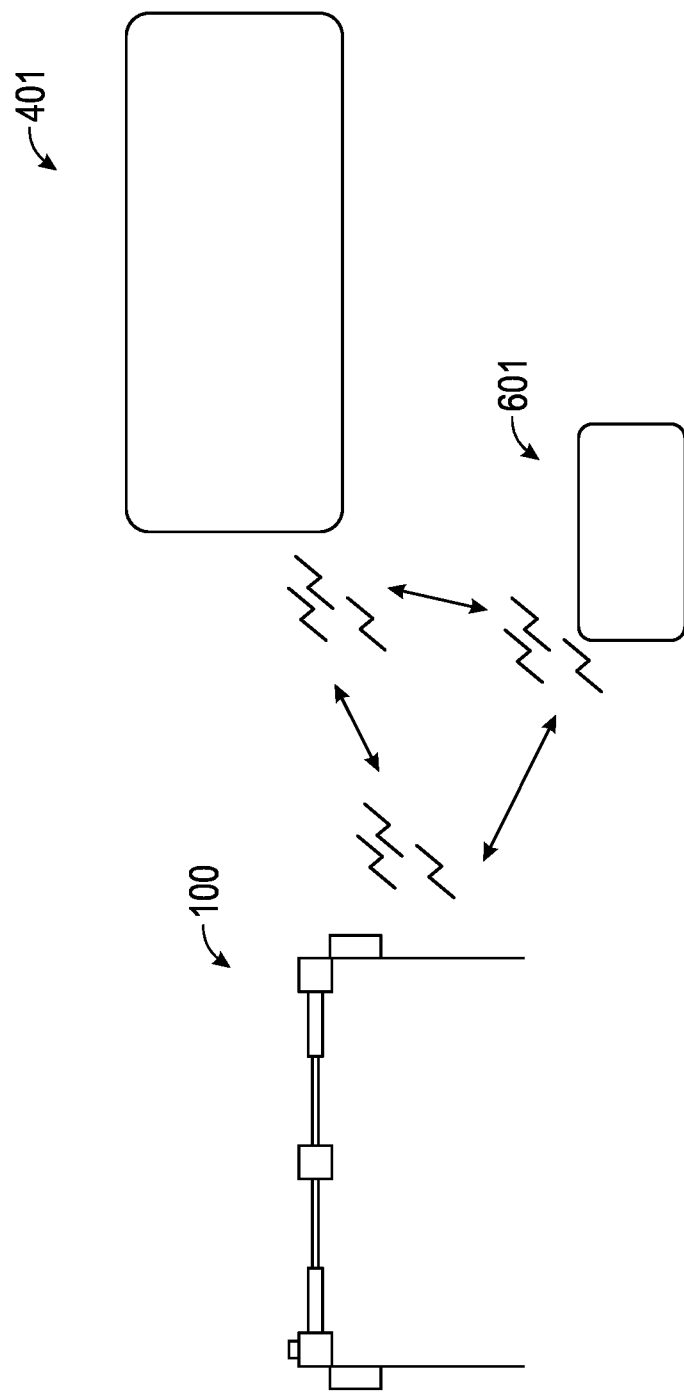
FIG. 6 is a schematic illustration of an eyewear device, context-sensitive remote control, and a network device.

FIG. 6 depicts an electronic device (eyewear device 100), a context-sensitive remote control (mobile device 401), and a network device 601. The eyewear device 100 may communicate directly with the mobile device 401 (e.g., via a Bluetooth™ connection) or indirectly via a wireless network device 601. In one example, the eyewear device 100 and the mobile device 401 initially establish a direct Bluetooth connection. If the eyewear device 100 or the mobile device 401 determine that a WiFi connection is available and that bandwidth requirements exceed that available via Bluetooth, the eyewear device 100 and the mobile device 401 may transition to communicating via WiFi. Otherwise, the eyewear device 100 and the mobile device 401 may continue using the direct Bluetooth connection, which has lower power consumption and less bandwidth than WiFi.

FIG. 7A is an illustration of a context-sensitive remote control with a controller layout configuration. The illustrated controller layout configuration includes a first joystick type 702A (FIG. 7B) in a first boundary box 703A, a second joystick type 702B (FIG. 7C) in a second boundary box 703B, a first configurable button 704A, and a second configurable button 704B. The joystick types may include additional types of joysticks such as a third joystick type 702C (FIG. 7D).

The illustrated controller layout configuration (and other configuration layouts) also includes a controller layout shortcut button 706A, a keyboard layout shortcut button 706B, and a touchpad layout shortcut button 706C. In one example, the shortcut buttons may be displayed during set-up of the context-sensitive remote controller, and thereafter omitted. In another example, the shortcut buttons remain available to enable a user to override a particular layout configuration. In another example, the shortcut buttons are available in one orientation (e.g., a horizontal orientation; see FIG. 9B), but not another (e.g., a vertical orientation; see FIG. 9A)

FIGS. 8A and 8B are illustrations of a context-sensitive remote control with a touchpad layout configuration in a vertical orientation (FIG. 8A) and a horizontal orientation (FIG. 8B), respectively. The illustrated vertical touchpad layout configuration includes a vertical touchpad input area that covers at least substantially all (i.e., greater than 90%) of the mobile device display area. The illustrated horizontal touchpad layout configuration includes a horizontal touchpad input area that also covers at least substantially all (i.e., greater than 90%) of the mobile device display area.

FIGS. 9A and 9B are illustrations of a context-sensitive remote control with a keyboard layout configuration in a vertical orientation (FIG. 9A) and a horizontal orientation (FIG. 9B), respectively. The illustrated vertical controller layout configuration includes a keypad 902A covering approximately half (i.e., 40% to 60%) of the mobile device display area and a touchpad input area 904 covering the remaining portion (i.e., 60% to 40%) of the mobile device display area. The illustrated horizontal controller layout configuration includes a larger keypad 902B than the keypad 902A in vertical controller layout, but no touchpad.

FIGS. 10A-10G are a flow charts 1000, 1010, 1012-1, 1012-2, 1014, 1016, and 1030 listing steps in example methods for implementing a context-sensitive remote control. Although the steps are described with reference to the eyewear device 100 as the electronic device being controlled and the mobile device 401 as the context-sensitive remote control controlling the electronic device, other implementations of the steps described, for other types of electronic devices, will be understood by one of skill in the art from the description herein. Additionally, it is contemplated that one or more of the steps shown in FIGS. 10A-10G, and described herein, may be omitted, performed simultaneously or in a series, performed in an order other than illustrated and described, or performed in conjunction with additional steps.

Figure 10A:
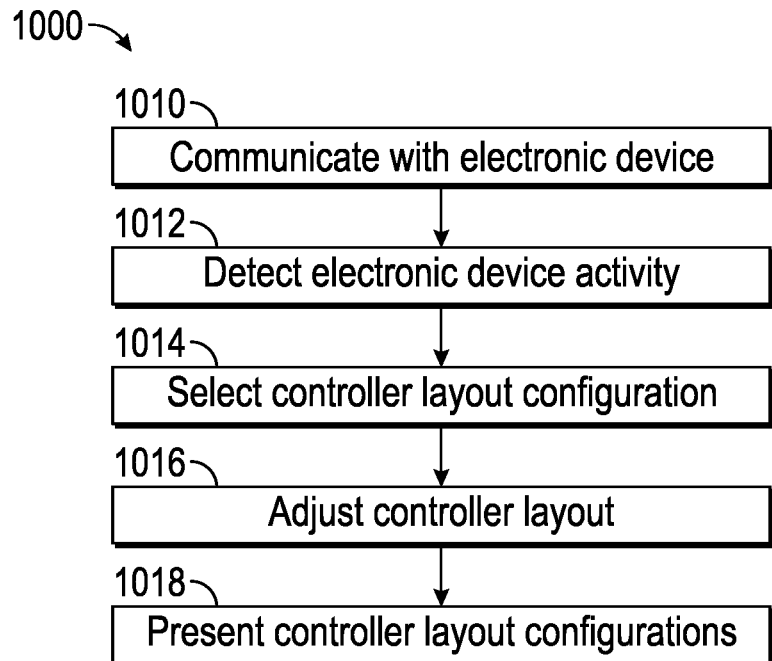
FIGS. 10A, 10B, 10C, 10D, 10E, 10F, and 10G are flow charts including steps for implementing a context-sensitive remote control.

FIG. 10A depicts a flow chart 1000 for configuring a context-sensitive remote control (e.g., mobile device 401). At block 1010, the context-sensitive remote control establishes communication with an electronic device (e.g., eyewear device 100). The context-sensitive remote control establishes communication with the electronic device via respective transceivers 424/520.

Figure 10B:
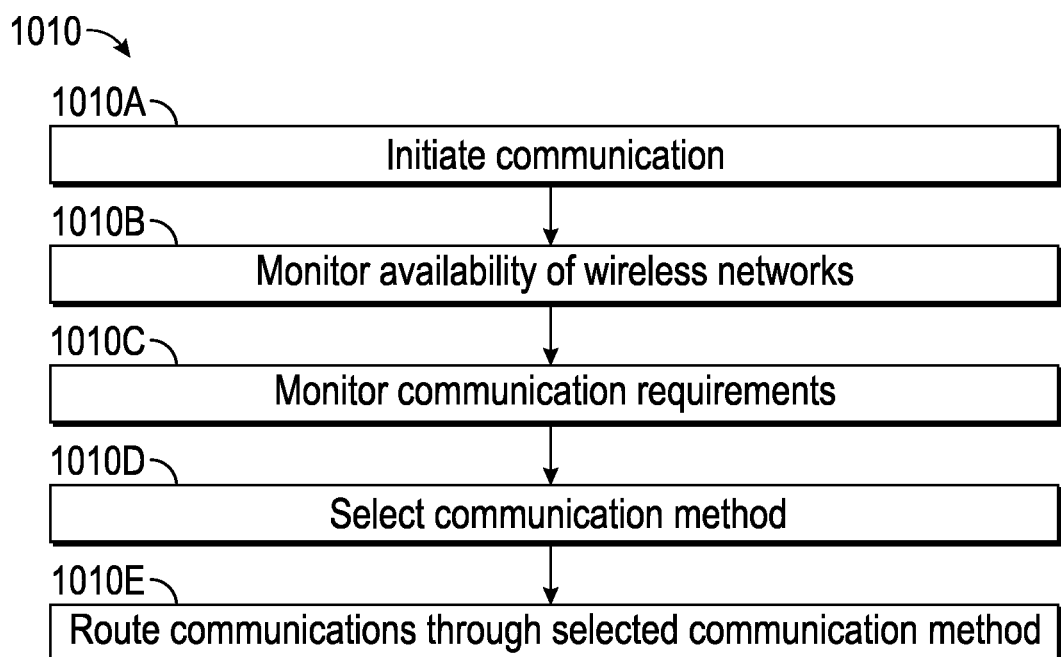
Figure 10C:
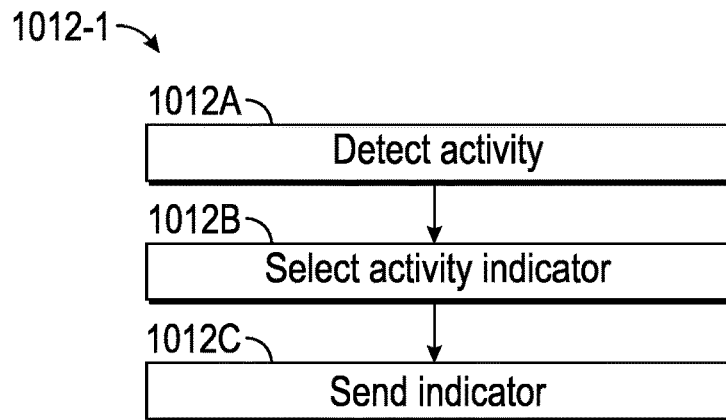
Figure 10D:
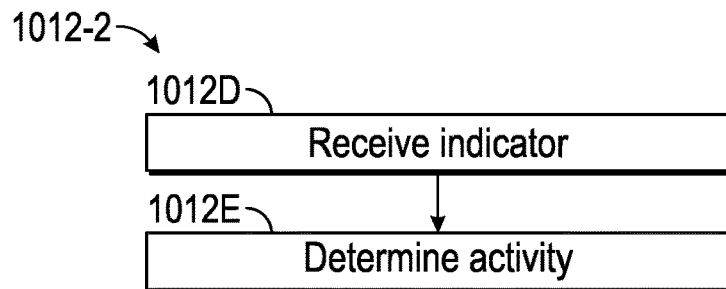

In an example, processor 432 executes remote communication utility 464 and processor 530 executes remote communication utility 564 to exchange information for initiating communication there between (block 1010A; FIG. 10B). The context-sensitive remote control and electronic device may initiate communication using a direct communication link (e.g., Bluetooth LE). Thereafter, the context-sensitive remote control and the electronic device each monitor available wireless networks (e.g., WiFi by periodically requesting signal strength information from their respective WiFi transceivers) and share identification information of the available wireless networks to which they have access (block 1010B). The context-sensitive remote control and the electronic device additionally monitor communication requirements (e.g., bandwidth) necessary to enable all the features of the context-sensitive remote control (block 1010C). For example, control information that enables the context-sensitive remote control to input text on the electronic device requires relatively low amount of bandwidth that can be adequately transferred via Bluetooth LE. Streaming video from the electronic device for display on the context-sensitive remote control (e.g., for debugging an application on the electronic device) may require greater amounts of bandwidth (such as available via a WiFi connection) for acceptable performance.

The context-sensitive remote control selects the communication method responsive to the wireless networks available to both the context-sensitive remote control and the electronic device and the communication requirements (block 1010D). For example, if the context-sensitive remote control determines that a particular WiFi connection is available to both the context-sensitive remote control and the electronic device (e.g., based on information collected from its WiFi transceiver and WiFi identification information shared by the electronic device; block 1010B), and that bandwidth requirements exceed that available via Bluetooth, the context-sensitive remote control may transition to communicating with the electronic device via WiFi (e.g., by sending a request to the electronic device and switching the communication method upon receiving a positive response). Otherwise, the context-sensitive remote control and electronic device may continue using the direct Bluetooth connection, which has lower power consumption and less bandwidth than WiFi. Once a communication method is selected, processor 432 and processor 530 route communications through transceivers for the selected communication method (block 1010E).

Referring back to FIG. 10A, at block 1012, the context-sensitive remote control detects an activity being performed by the electronic device (e.g., email, painting, user-interface navigation, gaming, etc.). In an example, processor 432 executes activity detection utility 462 and processor 530 executes activity detection utility 562 to enable context-sensitive remote control to detect the activity being performed on the electronic device.

The electronic device performs the steps of flow chart 1012-1 to detect activity of the electronic device and the context-sensitive remote control performs the steps of flow chart 1012-2 to detect activity of the electronic device. At block 1012A, the electronic device detects a current activity being performed by an electronic device. In an example, the processor 432 for the eyewear device, executing activity detection utility 462, monitors the threads it is currently executing. Each activity can have multiple threads of execution, and each thread can create windows. The thread that creates the window with which the user is currently working is referred to as a foreground thread, and the associated window is called the foreground window. The processor identifies the activity associated with the foreground window (by detecting the current foreground thread and identifying the associated activity) as the current activity.

At block 1012B, the processor 432 selects an activity indicator associated with the selected activity. For example, the processor may select a "1" for gaming, a "2" for touchpad input, a "3" for user-interface navigation, and a "4" for text/keyboard input). The processor 432 stores the selected indicator in memory 434.

At block 1012C, the processor 432 of the electronic device sends the indicator to the context sensitive remote control. The processor 432 retrieves the indicator from the memory 434 and sends a communication including the indicator to the context-sensitive remote control via the established communication channel (block 1010), e.g., via transceiver 424 or transceiver 436.

At block 1012D, the processor 530 of the context-sensitive remote control receives the indicator. The processor 530 receives the indicator from the context-sensitive remote control via the established communication channel, e.g., via transceiver 520 or transceiver 510. The processor 530 stores the received indicator in memory 540.

At block 1012E, the processor 530 of the context-sensitive remote control determines the activity being performed by the electronic device responsive the received indicator. The processor 530 may determine the activity by retrieving the activity associated with the received indicator (block 1012D) from a look-up table in memory 540. The look-up table may include a list of indicators and associated activities. For example, the look-up table may include a "1" associated with gaming, a "2" associated with touchpad input, a "3" associated with user-interface navigation, and a "4" associated with text/keyboard input).

Figure 10E:
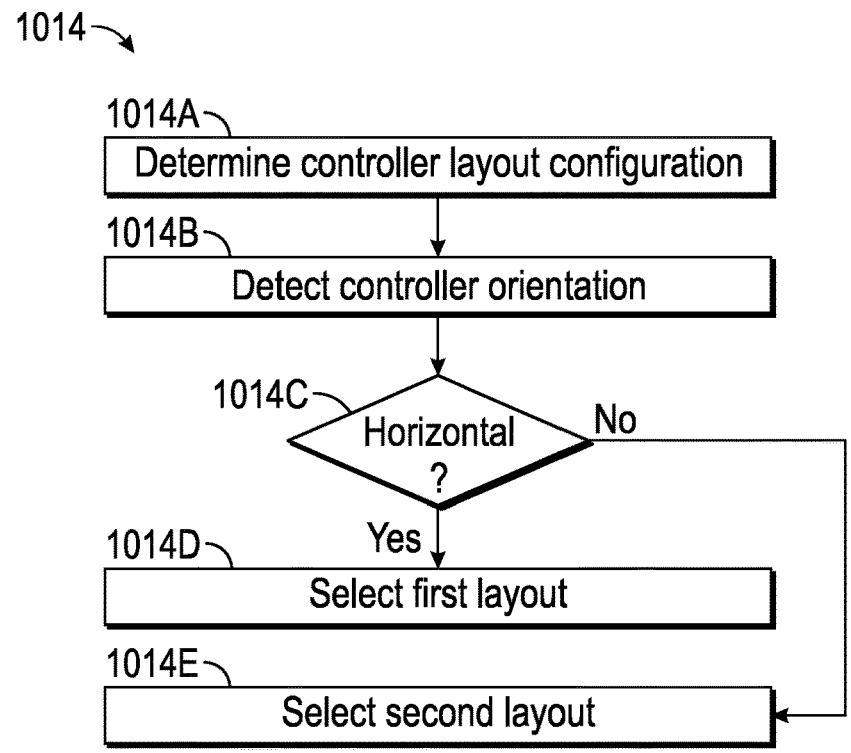
Figure 10F:
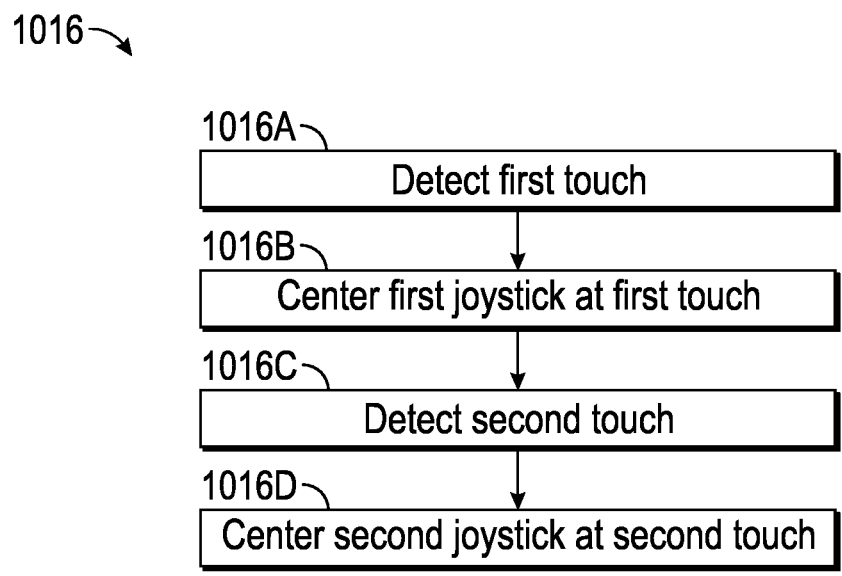

Referring back to FIG. 10A, at block 1014, the context-sensitive remote control selects the controller layout configuration responsive to the activity being performed on the electronic device. In an example, the processor 530 selects the controller layout by implementing the steps in flow chart 1014 (FIG. 10E).

At block 1014A, the processor 530 determines the controller layout configuration (e.g., controller, keyboard, touchpad, etc.) In an example, the processor 530 determines the controller layout configuration by retrieving the controller layout configuration associated with the determined activity (e.g., which is based on the received indicator) from a look-up table in memory 540. The look-up table may include a list of activities and associated controller layout configurations.

Additionally, at block 1014B, the processor 530 may detect controller orientation (horizontal or vertical). In an example, the processor 530 detects orientation by querying the IMU 572. At decisions block 1014C, if the controller is determined to be horizontal, processing proceeds at block 1014D with selection of a first layout of the determined controller layout configuration (e.g., as shown in FIGS. 7A, 8B, and 9B). Otherwise, processing proceeds at block 1014E with selection of a second layout of the determined controller layout configuration (e.g., as shown in FIGS. 8A and 9A).

Referring back to FIG. 10A, at block 1016, the context-sensitive remote control adjusts the controller layout. For example, the context-sensitive remote control may adjust the controller layout by adjusting the joysticks. In accordance with this example, at block 1016A, the processor 530 adjusts the controller layout by detecting a first touch on the display 580 in a first boundary box 703A (e.g., via the user input layer 591). At block 1016B, the processor 530 centers the first joystick 702A on the first touch within the first boundary box 703A (e.g., via the driver 582). At block 1016C, the processor 530 adjusts the controller layout by detecting a second touch on the display 580 in a second boundary box 703B (e.g., via the user input layer 591). At block 1016D, the processor 530 centers the second joystick 702B on the second touch within the second boundary box 703B (e.g., via the driver 582).

Referring back to FIG. 10A, at block 1018, the context-sensitive remote control presents the controller layout configuration. The processor 530 may retrieve the controller layout configuration from memory 540 and present it on display 580 via driver 582.

Figure 10G:
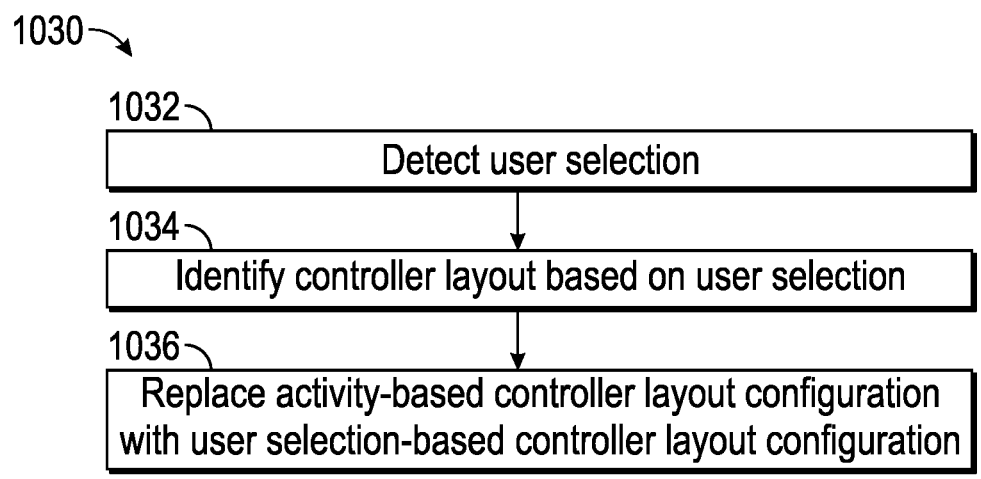

FIG. 10G depicts a flow chart 1030 of steps for overriding the controller layout configuration. At block 1032, the context-sensitive remote control detects a user selection of a layout configuration. In an example, the processor 530 monitors screen presses on the user input layer 591 of the display 580 for touches corresponding to reconfiguration buttons on the display 580. Each button corresponds to a controller layout configuration stored in memory 540A At block 1034, the context-sensitive remote control identifies a controller layout configuration based on the user selection. In an example, the processor 530 identifies a controller layout configuration responsive to the user selection. The processor 530 may identify the controller layout configuration corresponding to the particular reconfiguration button selected by the user, e.g., by retrieving from a table stored in memory 540.

At block 1036, the context-sensitive remote control replaces the activity-based controller layout configuration with the user selection-based controller layout configuration. In an example, the processor 530 replaces the controller layout selected according to the process of FIG. 10A with the controller layout configuration based on the user selection in block 1032. The processor 530 may retrieve the user-selection based controller layout configuration from memory 540 and present it on display 580 via driver 582.

Any of the functionality described herein for an electronic device (e.g., the eyewear device 100), a context-sensitive remote control (e.g., the mobile device 401), and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A context-sensitive remote control for use with an electronic device, the electronic device configured to perform a plurality of activities, the context-sensitive remote control comprising:
   a display having a display area;
   at least one transceiver;
   a memory storing a plurality of controller layout configurations for presentation in the display area, each of the plurality of controller layout configurations including at least one controller reconfiguration button and each of the controller reconfiguration buttons associated with a respective one of the plurality of controller layout configurations;

a processor coupled to the at least one transceiver and the memory; and programming in the memory, wherein execution of the programming by the processor configures the processor to perform functions, including functions to:

establish, via the at least one transceiver, communication with the electronic device;

detect one of the plurality of activities currently being performed by the electronic device;

select one of the plurality of controller layout configurations responsive to the detected one of the plurality of activities currently being performed by the electronic device;

present, via the display, the selected one of the plurality of controller layout configurations in the display area of the display;

detect a user selection of one of the plurality of controller reconfiguration buttons in the display area; and replace, via the display, the selected one of the plurality of controller layout configurations with the respective one of the plurality of controller layout configurations associated with the detected user selection in the display area of the display.

2. The context-sensitive remote control of claim 1, wherein the plurality of controller layout configurations comprises a game controller configuration, a keyboard configuration, and a touchpad configuration.

3. The context-sensitive remote control of claim 2, wherein the plurality of controller layout configurations further comprises a debug configuration.

4. The context-sensitive remote control of claim 1, wherein the plurality of controller layout configurations comprises at least one of a game controller configuration, a keyboard configuration, or a touchpad configuration comprising a first layout for the display area of the display and a second layout for the display area of the display and wherein the context-sensitive remote control further comprises:

an inertial measurement unit (IMU) coupled to the processor, the IMU configured to detect at least one of orientation or movement of the context-sensitive remote control;

wherein the execution of the programming by the processor configures the context-sensitive remote control to perform additional functions, including functions to:

detect, using the IMU, if the context-sensitive remote control is in a first orientation or a second orientation;

wherein the select function is configured to:

select the first layout when the context-sensitive remote control is in the first orientation; and select the second layout when the context-sensitive remote control is in the second orientation.

5. The context-sensitive remote control of claim 4, wherein the first orientation is a horizontal orientation, the second orientation is a vertical orientation, the first layout of the keyboard configuration includes a first keyboard covering at least 90% of the display area, and the second layout of the keyboard configuration includes a second keyboard covering a first portion of the display area and a touchpad entry region covering a second portion of the display area.

6. The context-sensitive remote control of claim 1, wherein the display area is touch sensitive and includes a first boundary box and a second boundary box, the plurality of controller layout configurations comprises a game controller configuration including a first a joystick and a second joystick, and the execution of the programming by the processor configures the context-sensitive remote control to perform additional functions, including functions to;

detect a first initial touch at a first initial location within the first boundary box;

detect a second initial touch at a second initial location within the second boundary box; and configure the game controller configuration with the first joystick centered at the first initial location within the first boundary box and the second joystick centered at the second initial location within the second boundary box.

7. The context-sensitive remote control of claim 1, wherein the display area is touch sensitive.

8. The context-sensitive remote control of claim 1, wherein the at least one transceiver comprises;

a first transceiver; and a second transceiver;

wherein the execution of the programming by the processor configures the context-sensitive remote control to perform additional functions, including functions to:

monitor availability of wireless networks;

monitor communication requirement between the context-sensitive remote control and the electronic device; and select the first transceiver or the second transceiver for communication between the context-sensitive remote control and the electronic device responsive to the availability of the wireless networks and the communication requirements.

9. A context-sensitive remote control method for use with an electronic device, the electronic device configured to perform a plurality of activities, the method comprising:

establishing, by a context-sensitive remote control, communication with the electronic device, the context-sensitive remote control comprising at least one transceiver and a display having a display area;

detecting one of the plurality of activities currently being performed by the electronic device;

selecting one of a plurality of controller layout configurations responsive to the detected one of the plurality of activities currently being performed by the electronic device, each of the plurality of controller layout configurations including at least one controller reconfiguration button and each of the controller reconfiguration buttons associated with a respective one of the plurality of controller layout configurations;

presenting, via the display, the selected one of the plurality of controller layout configurations in the display area of the display;

detecting a user selection of one of the plurality of controller reconfiguration buttons in the display area; and replacing, via the display, the selected one of the plurality of controller layout configurations with the respective one of the plurality of controller layout configurations associated with the detected user selection in the display area of the display.

10. The method of claim 9, wherein the plurality of controller layout configurations comprises a game controller configuration, a keyboard configuration, and a touchpad configuration.

11. The method of claim 10, wherein the plurality of controller layout configurations further comprises a debug configuration.

12. The method of claim 9, wherein the plurality of controller layout configurations comprises at least one of a game controller configuration, a keyboard configuration, or a touchpad configuration comprising a first layout for the display area of the display and a second layout for the display area of the display and wherein the method further comprises:
  detecting, using an inertial measurement unit (IMU), if the context-sensitive remote control is in a first orientation or a second orientation;
  wherein the selecting comprises:
    selecting the first layout when the context-sensitive remote control is in the first orientation; and
    selecting the second layout when the context-sensitive remote control is in the second orientation.

13. The method of claim 12, wherein the first orientation is a horizontal orientation, the second orientation is a vertical orientation, the first layout of the keyboard configuration includes a first keyboard covering at least 90% of the display area, and the second layout of the keyboard configuration includes a second keyboard covering a first portion of the display area and a touchpad entry region covering a second portion of the display area.

14. The method of claim 9, wherein the display area is touch sensitive and includes a first boundary box and a second boundary box, the plurality of controller layout configurations comprises a game controller configuration including a first a joystick and a second joystick, and the method further comprises:
  detecting a first initial touch at a first initial location within the first boundary box;
  detecting a second initial touch at a second initial location within the second boundary box; and
  configuring the game controller configuration with the first joystick centered at the first initial location within the first boundary box and the second joystick centered at the second initial location within the second boundary box.

15. The method of claim 9, wherein the at least one transceiver comprises a first transceiver and a second transceiver, the method further comprising;
  monitoring availability of wireless networks;
  monitoring communication requirements between the context-sensitive remote control and the electronic device; and
  selecting the first transceiver or the second transceiver for communication between the context-sensitive remote control and the electronic device responsive to the availability of the wireless networks and the communication requirements.

16. A non-transitory computer-readable medium storing program code which, when executed, is operative to cause an electronic processor to perform the steps of:
  establishing, by a context-sensitive remote control, communication with an electronic device configured to perform a plurality of activities, the context-sensitive remote control comprising at least one transceiver and a display having a display area;
  detecting one of the plurality of activities currently being performed by the electronic device;
  selecting one of a plurality of controller layout configurations responsive to the detected one of the plurality of activities currently being performed by the electronic device, each of the plurality of controller layout configurations including at least one controller reconfiguration button and each of the controller reconfiguration buttons associated with a respective one of the plurality of controller layout configurations;
  detecting a user selection of one of the plurality of controller reconfiguration buttons in the display area; and
  presenting, via the display, the selected one of the plurality of controller layout configurations in the display area of the display.

17. The non-transitory computer-readable medium storing program code of claim 16, wherein the plurality of controller layout configurations comprises at least one of a game controller configuration, a keyboard configuration, or a touchpad configuration comprising a first layout for the display area of the display and a second layout for the display area of the display and wherein the program code, when executed, is operative to cause the electronic processor to perform the steps of:
  detecting, using an inertial measurement unit (IMU), if the context-sensitive remote control is in a first orientation or a second orientation;
  wherein the selecting comprises:
    selecting the first layout when the context-sensitive remote control is in the first orientation; and
    selecting the second layout when the context-sensitive remote control is in the second orientation.

18. The non-transitory computer-readable medium storing program code of claim 17, wherein the first orientation is a horizontal orientation, the second orientation is a vertical orientation, the first layout of the keyboard configuration includes a first keyboard covering at least 90% of the display area, and the second layout of the keyboard configuration includes a second keyboard covering a first portion of the display area and a touchpad entry region covering a second portion of the display area.

19. The non-transitory computer-readable medium storing program code of claim 16, wherein the at least one transceiver comprises a first transceiver and a second transceiver and wherein the program code, when executed, is operative to cause the electronic processor to perform the steps of:
  monitoring availability of wireless networks;
  monitoring communication requirement between the context-sensitive remote control and the electronic device; and
  selecting the first transceiver or the second transceiver for communication between the context-sensitive remote control and the electronic device responsive to the availability of the wireless networks and the communication requirements.

20. The non-transitory computer-readable medium storing program code of claim 16, wherein the display area is touch sensitive and includes a first boundary box and a second boundary box, the plurality of controller layout configurations comprises a game controller configuration including a first a joystick and a second joystick, and wherein the program code, when executed, is operative to cause the electronic processor to perform the steps of:
  detecting a first initial touch at a first initial location within the first boundary box;
  detecting a second initial touch at a second initial location within the second boundary box; and
  configuring the game controller configuration with the first joystick centered at the first initial location within the first boundary box and the second joystick centered at the second initial location within the second boundary box.

\* \* \* \* \*